(12) United States Patent
Shor

(10) Patent No.: US 10,012,136 B2
(45) Date of Patent: Jul. 3, 2018

(54) SYSTEM AND METHOD FOR RECOVERING THERMAL ENERGY FOR AN INTERNAL COMBUSTION ENGINE

(71) Applicant: Brian Shor, St. Catherine (JM)

(72) Inventor: Brian Shor, St. Catherine (JM)

(*) Notice: Subject to any disclaimer, the term of this patent is extended or adjusted under 35 U.S.C. 154(b) by 335 days.

(21) Appl. No.: 14/884,405

(22) Filed: Oct. 15, 2015

(65) Prior Publication Data
US 2017/0058760 A1 Mar. 2, 2017

Related U.S. Application Data

(60) Provisional application No. 62/209,654, filed on Aug. 25, 2015.

(51) Int. Cl.
| | | |
|---|---|---|
| F02B 37/04 | (2006.01) | |
| F02G 5/04 | (2006.01) | |
| F01N 5/02 | (2006.01) | |
| F01K 23/06 | (2006.01) | |
| F02B 39/08 | (2006.01) | |

(52) U.S. Cl.
CPC ............ *F02B 37/04* (2013.01); *F01K 23/065* (2013.01); *F01N 5/02* (2013.01); *F02B 39/085* (2013.01); *F02G 5/04* (2013.01); *F02G 2260/00* (2013.01); *Y02E 20/14* (2013.01); *Y02T 10/144* (2013.01); *Y02T 10/16* (2013.01); *Y02T 10/166* (2013.01)

(58) Field of Classification Search
CPC ...... F02B 37/04; F02B 39/085; F02B 37/007; F01K 23/065; F01N 5/02; F02G 5/04; F02G 2260/00; F02G 5/02; Y02T 10/166; Y02T 10/16; Y02T 10/144; Y02E 20/14

USPC ............................................. 60/604
See application file for complete search history.

(56) References Cited

U.S. PATENT DOCUMENTS

| | | | | |
|---|---|---|---|---|
| 4,366,674 A | * | 1/1983 | Eakman | F01N 5/02 |
| | | | | 60/618 |
| 6,089,020 A | * | 7/2000 | Kawamura | F01N 5/02 |
| | | | | 165/159 |
| 6,497,090 B2 | | 12/2002 | Bronicki et al. | |
| 7,454,911 B2 | | 11/2008 | Tafas | |

(Continued)

FOREIGN PATENT DOCUMENTS

| | | | | |
|---|---|---|---|---|
| DE | 102016010272 A1 | * | 3/2017 | ............... F01N 5/02 |
| JP | 5367591 B2 | * | 12/2013 | ............... F02G 5/00 |
| WO | WO 2013167932 A1 | * | 11/2013 | ........... F01K 23/065 |

*Primary Examiner* — Jason Newton
(74) *Attorney, Agent, or Firm* — Woods Oviatt Gilman LLP; Dennis B. Danella, Esq.

(57) ABSTRACT

A system for recovering thermal energy from one or more devices of an engine is provided to increase the overall efficiency of the engine. The system comprises an exhaust turbocharger, which is in fluid communication with the engine and driven by a supply of exhaust gas from the engine. The driven exhaust turbocharger is configured to supply compressed air to the engine. A boiler is provided to transfer heat from the exhaust gas to a heat-transfer fluid to generate a heat-transfer vapor. The vapor operates to drive a vapor turbocharger to supply additional compressed air to the engine. The vapor is further used to absorb heat from a coolant fluid used in an engine cooling system before a vapor compressor compresses the vapor back to a semi-saturated state and returns it to the boiler to complete a vapor cycle. A method for implementing the above-mentioned system is also provided.

33 Claims, 1 Drawing Sheet

(56) References Cited

U.S. PATENT DOCUMENTS

| | | | | |
|---|---|---|---|---|
| 8,429,912 | B2* | 4/2013 | Guggenberger | F02B 37/013 |
| | | | | 123/562 |
| 8,661,816 | B2 | 3/2014 | Mathews et al. | |
| 8,806,869 | B2 | 8/2014 | Petrovic | |
| 2011/0209473 | A1* | 9/2011 | Fritz | F01K 23/065 |
| | | | | 60/605.2 |
| 2013/0276446 | A1* | 10/2013 | Hall | F01K 23/065 |
| | | | | 60/615 |
| 2014/0144136 | A1* | 5/2014 | Versteyhe | F02G 5/02 |
| | | | | 60/605.1 |
| 2016/0024923 | A1* | 1/2016 | Versteyhe | F01K 25/08 |
| | | | | 92/13 |

\* cited by examiner

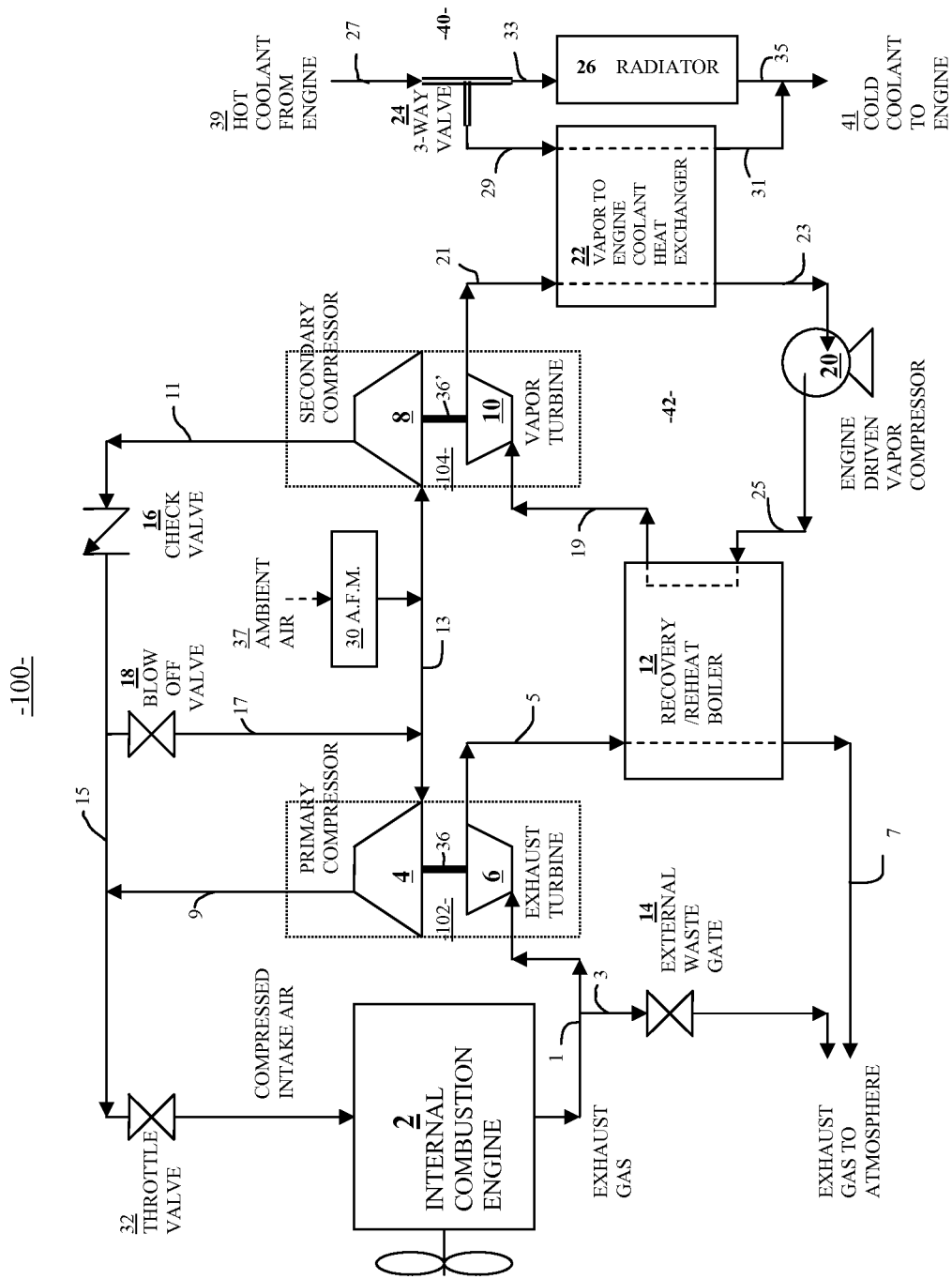

SYSTEM AND METHOD FOR RECOVERING THERMAL ENERGY FOR AN INTERNAL COMBUSTION ENGINE

CROSS-REFERENCE TO RELATED APPLICATIONS

This application claims the benefit of U.S. patent application Ser. No. 62/209,654, filed on Aug. 25, 2015, which is hereby incorporated by reference in its entirety.

TECHNICAL FIELD

The present invention is directed to a system and method for recovering a portion of thermal energy lost through the exhaust and cooling systems of an internal combustion engine and utilizes this recovered energy to drive the internal combustion engine. In particular, this energy recovery system and method may incorporate the use of a modified Carnot vapor power cycle, which may recover approximately 75% of the potential wasted thermal energy lost through the exhaust and cooling systems.

BACKGROUND OF THE INVENTION

A typical high efficiency internal combustion engine (e.g., gasoline, diesel, etc.) has an operating efficiency of approximately 35%. As such, approximately 35% of the chemical energy within the fuel gets converted into the mechanical energy that drives the wheels and auxiliary systems of the vehicle in which the engine is installed. Approximately 60% of the fuel's chemical energy is lost as thermal energy through the engine's devices, such as its exhaust and cooling systems. The prior art discloses various concepts directed to the recovery of thermal energy lost through the devices of an internal combustion engine.

In one example, U.S. Pat. No. 4,366,674 to Eakman is directed to a system that uses a Rankine vapor power cycle to recover thermal energy from the exhaust and cooling system with the aid of a vapor powered turbocharger. An automobile's engine has to operate under varying loads so to overcome the slow response of the engine and system to increased load demands Eakman uses an afterburner, which has the negative effect of increasing fuel consumption and increasing recovery demands on overall system. An automobile's engine is under non-steady state operation, so with varying loads and cycle flow rates, the Rankine cycle has negative effects of poor stability for liquid going to re-circulating pump, high recirculation losses and thermal loss at the condenser making it not practical in an automobile's engine.

In another example, U.S. Pat. No. 6,089,020 to Kawamura is directed to a heat recovering apparatus for use in a cogeneration system with an engine. The apparatus includes several turbochargers in series, one turbocharger is driven by the engine's exhaust gas, and another turbocharger driven by an energy recovering turbine comprising an exhaust gas turbine and a steam turbine driven by steam generated by a ceramic heat exchanger which indirectly heats water from the exhaust gas that is downstream of the turbochargers.

In a further example, U.S. Pat. No. 7,454,911 to Tafas is directed to an energy recovery system and method of using the same. The system is configured so that the exhaust gas from the engine flows through a steam generating boiler then to an exhaust turbine. The steam generated by the boiler then flows to the steam turbine that has a common shaft with the exhaust turbine which then drives an electric generator. The steam that leaves the steam turbine is condensed and pumped through the engine's fluid cooling circuit and back to the boiler. This system can only appropriately be used on engines that power hybrid type automobiles so the electrical energy can be utilized. Also, because of varying loads and rotational speed of an automobile's engine, there will be flow differentials across the two turbine wheels causing one wheel to retard the second based on engine operating conditions. Additionally, condensing the steam and pumping the water through engine block and back into boiler induces flow and fluid stability challenges due to automobile engines needing the ability operate at idle and full load within a few seconds.

What is needed is a system and method that will overcome the flow balance and fluid stability challenges and higher recirculation losses of the prior recovery systems for use on an internal combustion engine. The present invention will fulfill this need as well as other needs.

BRIEF DESCRIPTION OF THE DRAWING

The accompanying drawing forms a part of this specification and is to be read in conjunction therewith, wherein:

FIG. 1 is a schematic showing one aspect of the system and method of the present invention in conjunction with an internal combustion engine.

The exemplification set out herein illustrates one embodiment of the invention, in one form, and such exemplification is not to be construed as limiting the scope of the invention in any manner.

SUMMARY OF THE INVENTION

Briefly described, the present invention is generally directed to a thermal energy recovery system configured to capture thermal energy lost through operation of devices of an engine, and utilize the captured thermal energy to increase the overall efficiency of the engine. One of the devices may include an exhaust system including an exhaust manifold for emitting exhaust gas, and another one of the devices may include a cooling system including a coolant fluid.

The system may comprise an exhaust turbocharger, a boiler, a vapor turbocharger, a heat exchanger, and a vapor compressor. The exhaust turbocharger includes an exhaust turbine and a primary compressor. The exhaust turbine is in fluid communication and downstream of the exhaust manifold, and the primary compressor is in fluid communication and downstream of an ambient air intake. The boiler includes a first heat exchange portion and a second heat exchange portion, wherein the first heat exchange portion of the boiler is in fluid communication and downstream of the exhaust turbine. The vapor turbocharger includes a vapor turbine and a secondary compressor, wherein the vapor turbine is in fluid communication and downstream of the second heat exchange portion of the boiler, and the secondary compressor is in fluid communication and positioned downstream of the ambient air intake. The heat exchanger includes a first heat exchange portion and a second heat exchange portion. The first heat exchange portion of the heat exchanger is in fluid communication and positioned downstream of the vapor turbine, and the second heat exchange portion of the heat exchanger is in fluid communication with a coolant fluid within the engine cooling system. The vapor compressor is in fluid communication and downstream of the first heat exchange portion of heat exchanger. The vapor compressor is also in fluid communication and upstream of the second heat exchange portion of the boiler.

In operation, the exhaust turbine is driven by the exhaust gas emitted from the exhaust manifold, which in turn allows the primary compressor to compress the air from the ambient air intake to provide compressed air to an engine air intake. The exhaust gas emitted from the exhaust turbine is passed through the first heat exchange portion of the boiler. Heat from the exhaust gas is transmitted to a heat-transfer liquid passing through the second heat exchange portion of the boiler to form a heat-transfer vapor. The vapor turbine is driven by the heat-transfer vapor emitted from the second heat exchange portion of the boiler, which in turn allows the secondary compressor to compress the air from the ambient air intake to provide compressed air to the engine air intake. Heat-transfer vapor emitted from the vapor turbine is passed through the first heat exchange portion of the heat exchanger, wherein heat from the coolant fluid passing through the second heat exchange portion of the heat exchanger is transmitted to the heat-transfer vapor. Further, the vapor compressor is configured to compress the heat-transfer vapor to a semi-saturated state.

Other aspects of the system are provided herein. For example, the vapor compressor may be driven by the engine. Further, a blow-off valve may be in fluid communication with and disposed downstream of the primary compressor and the secondary compressor. The blow-off valve is configured to recirculate the compressed air emitted from at least one of the primary compressor or the secondary compressor back to the suction of the primary compressor and the secondary compressor whenever a throttle valve to the engine air intake is closed. A check valve may be in fluid communication and downstream of the secondary compressor to prevent the compressed air emitted from the primary compressor from being communicated to the secondary compressor. An external wastegate valve may be in fluid communication with the exhaust manifold to regulate at least one of an upper power limit and an upper torque limit of the engine. Also, the system may include a three-way valve and a radiator disposed downstream of the three-way valve. The three-way valve may be configured to selectively or automatically direct the coolant fluid to one of, or at least one of, the second heat exchange portion of the heat exchanger or the radiator to remove heat from the coolant fluid. A throttle valve may be disposed upstream of the engine air intake and downstream of the primary compressor and the secondary compressor to control the amount of compressed air being fed to the engine.

In yet another aspect, a method of capturing thermal energy lost through operation of devices of an engine and utilizing the captured thermal energy to increase the overall efficiency of the engine is provided. One of the devices may include an exhaust system including an exhaust manifold for emitting exhaust gas, and another one of the devices may be a cooling system including a coolant fluid. The method may comprise: providing an exhaust turbocharger including an exhaust turbine and a primary compressor, the exhaust turbine is in fluid communication and downstream of the exhaust manifold, and the primary compressor is in fluid communication and downstream of an ambient air intake; providing a boiler including a first heat exchange portion and a second heat exchange portion, the first heat exchange portion of the boiler is in fluid communication and downstream of the exhaust turbine; providing a vapor turbocharger including a vapor turbine and a secondary compressor, the vapor turbine is in fluid communication and downstream of the second heat exchange portion of the boiler, and the secondary compressor is in fluid communication and positioned downstream of the ambient air intake; providing a heat exchanger including a first heat exchange portion and a second heat exchange portion, the first heat exchange portion of the heat exchanger is in fluid communication and positioned downstream of the vapor turbine, and the second heat exchange portion of the heat exchanger is in fluid communication with a coolant fluid within the engine cooling system; providing a vapor compressor in fluid communication and downstream of the first heat exchange portion of heat exchanger, the vapor compressor is in fluid communication and upstream of the second heat exchange portion of the boiler; driving the exhaust turbine by the exhaust gas emitted from the exhaust manifold; compressing the air from the ambient air intake using the primary compressor to provide compressed air to an engine air intake; passing the exhaust gas emitted from the exhaust turbine through the first heat exchange portion of the boiler; passing a heat-transfer liquid through the second heat exchange portion of the boiler to form a heat-transfer vapor; driving the vapor turbine by the heat-transfer vapor emitted from the second heat exchange portion of the boiler; compressing the air from the ambient air intake using the secondary compressor to provide compressed air to the engine air intake; passing the heat-transfer vapor emitted from the vapor turbine through the first heat exchange portion of the heat exchanger; and passing the coolant fluid through the second heat exchange portion of the heat exchanger to emit heat from the coolant fluid to the heat-transfer vapor; compressing the heat-transfer vapor using the vapor compressor to a semi-saturated state; and communicating the semi-saturated vapor to the second heat exchange portion of the boiler.

This method may also include driving the vapor compressor with the engine. The method may also include providing a blow-off valve in fluid communication with and disposed downstream of the primary compressor and the secondary compressor; and recirculating the compressed air emitted from at least one of the primary compressor or the secondary compressor, through the blow-off valve, back to the suction of the primary compressor and the secondary compressor when a throttle valve of the engine air intake is closed.

The method may also include providing a check valve in fluid communication and downstream of the secondary compressor; and preventing the compressed air emitted from the primary compressor from being communicated to the secondary compressor using the check valve.

The method may also include providing an external wastegate valve in fluid communication with the exhaust manifold; and regulating at least one of an upper power limit and an upper torque limit of the engine using the external wastegate valve.

The method may also include providing a three-way valve; providing a radiator disposed downstream of the three-way valve; and selectively directing the coolant fluid to at least one of the second heat exchange portion of the heat exchanger or the radiator to remove heat from the coolant fluid. The three-way valve may be configured to automatically direct the coolant fluid to at least one of the second heat exchange portion of the heat exchanger or the radiator to remove heat from the coolant fluid. Further, the three-way valve may be configured to selectively direct the coolant fluid to either the second heat exchange portion of the heat exchanger or the radiator to remove heat from the coolant fluid.

The method may further include providing a throttle valve disposed upstream of the engine air intake and downstream of the primary compressor and the secondary compressor; and selectively controlling a flow of compressed air being fed to the engine using the throttle valve.

DETAILED DESCRIPTION OF THE INVENTION

In general, the system and method described herein for allowing mechanical, flow, and electrical connections in accordance with the present invention may be implemented in a variety of embodiments and methods.

The present system and method is directed to recovering a portion of thermal energy that is lost through typical exhaust and cooling systems of an internal combustion engine, and use this recovered energy to increase the overall efficiency of the internal combustion engine. This thermal energy recovery is done with the aid of a vapor power cycle, which optimizes the air-intake, exhaust system and cooling system of the internal combustion engine. The present system and method is a solution to certain stability issues encountered in the prior art. The present system and method also addresses flow balance differential issues that have been seen in the prior art and thus has the ability to operate at idle and full load within a short time frame, such as, for example, a few seconds. The present system and method also avoids the negative effects of requiring an afterburner that increases fuel consumption and recovery demands on the overall system. On average, the present system and method decreases the compression ratio (CR) of the internal combustion engine from approximately 10:1 down to approximately 8:1. With the lower CR and increased forced induction, the piston does less work on the compression stroke to generate the appropriate combustion pressure. In one example, the present invention allows a 3300 lb automobile with a 2 liter gas engine to generate 300 bhp and achieve up to 55 mile per gallon during highway travel. The present system and method may be used and installed on any engine, including hybrid-type engines. When the present system is installed on a hybrid-type engine, the system and method may be implemented to charge the battery (not shown) of the hybrid-type engine.

Referring now to the drawing in more detail, particularly to FIG. 1, reference numeral 100 designates a thermal energy recovery system 100 which is configured to capture a portion of the thermal energy lost through the devices (not shown) of an internal combustion engine 2, so as to implement the captured energy to increase the overall efficiency of the internal combustion engine 2. It should be understood that the devices of internal combustion engine 2 may be, but are not limited to, the exhaust and cooling systems of internal combustion engine 2. The exhaust gas from the internal combustion engine 2 is directed to an exhaust turbine 6 via an exhaust manifold 1. The exhaust gas drives exhaust turbine 6 by expanding and causing the exhaust turbine 6 to rotate, releasing a substantial amount of the pressure and kinetic energy of the exhaust gas. Exhaust turbine 6 is coupled to a primary compressor 4 via a shaft 36. Exhaust turbine 6 and primary compressor 4 in conjunction form the exhaust turbocharger 102. An air flow meter 30 may be disposed upstream from the intake of primary compressor 4. In certain aspects, exhaust turbocharger 102 may be a Garrett T3/T4 hybrid turbocharger, for example. It should be understood that primary compressor 4 may be, but is not limited to, an axial compressor, centrifugal compressor, mixed-flow compressor, or a free-piston gas generator.

Primary compressor 4 is configured to compress ambient air provided from an ambient air intake 37, connected with the air flow meter 30, which is then sent, via charge pipe 9, to an engine air intake 15 to operate internal combustion engine 2. A throttle valve 32 may be positioned upstream of internal combustion engine 2 to control the incoming compressed air. After driving exhaust turbine 6, the exhaust gas is directed through a pipe 5 to a recovery/reheat boiler 12 (hereinafter "boiler"), particularly, a first heat exchange portion of boiler 12. A heat-transfer liquid disposed within a second heat exchange portion of boiler 12 is indirectly heated and converted into a superheated vapor state (hereinafter "heat-transfer vapor"). For example, this heat-transfer liquid may be a nonflammable liquid that boils at atmospheric pressure between 35° C. and 50° C. (such as, but not limited to, 3M-Novec-649), but other varieties of the heat-transfer liquid may be used. Boiler 12 may further comprise of a vapor drum, a mud drum, a baffle plate, a gas pass, superheater, and with a series of generating tubes interposedly connecting the vapor drum with the mud drum. It should also be understood that in certain instances, the super heater tubes and generating tubes may be bent and fitted such that their configuration optimizes the efficiency of boiler 12. The components of boiler 12 may also be constructed from stainless steel, such as, but not limited to, Grade 304 or 304L.

The heat from the exhaust gas indirectly heats the heat-transfer liquid within the vapor drum, mud drum, generating tubes, and superheater tubes, for example, of boiler 12 to the superheated vapor state. This heat-transfer vapor is used to drive a vapor turbocharger 104 (discussed below), which runs in parallel with exhaust turbocharger 102. The combination of turbochargers 102, 104 generates a pressurized air intake that works to operate internal combustion engine 2. A heating coil (not shown) may be installed on boiler 12 to preheat the heat-transfer liquid to a proper temperature at the startup of internal combustion engine 2.

After indirectly heating the heat-transfer liquid through the operation of boiler 12, the exhaust gas is directed out to atmosphere via an exhaust line 7 (e.g., a pipe). The heat-transfer vapor drives a vapor turbine 10 via a vapor discharge line 19. Vapor turbine 10 is coupled to a secondary compressor 8 via a shaft 36'. It should be understood that secondary compressor 8 may be, but is not limited to, an axial compressor, centrifugal compressor, mixed-flow compressor, or a free-piston gas generator. Vapor turbine 10 and secondary compressor 8 in conjunction form the vapor turbocharger 104. Vapor turbocharger 104 may also comprise a turbine housing (not shown), turbine wheel (not shown), turbine housing backing plate (not shown), CHRA bearing housing (not shown), compressor wheel (not shown), and a compressor housing (not shown). The components of the vapor turbocharger 104 may also be constructed from aluminum, for example.

As mentioned above, vapor turbocharger 104 operates in parallel with exhaust turbocharger 102 to generate pressurized intake air for internal combustion engine 2. The heat-transfer vapor from boiler 12 expands in vapor turbine 10 and in turn drives secondary compressor 8, via shaft 36', which operates to compress ambient air. Secondary compressor 8 provides this compressed air to engine air intake 15 via charge line 11. Downstream from the discharge of secondary compressor 8 is a check valve 16 that prevents primary compressor 4 from recirculating compressed air to secondary compressor 8, by way of the charge line 11, which would otherwise occur when the pressure of the compressed air discharged from primary compressor 4 is greater than the pressure of the compressed air discharged from secondary compressor 8. Check valve 16 may be, but is not limited to, an inline 2" full-flow aluminum check valve.

To prevent air surging from primary compressor 4 and secondary compressor 8, a blow-off valve 18 is installed on air intake line 15 via a blow-off line 17. When throttle valve 32 is closed, blow-off valve 18 will open to recirculate air from primary compressor 4 and secondary compressor 8 back to a common suction 13. Blow-off valve 18 may be, but is not limited to, a 1.25" aluminum blow off valve.

After driving vapor turbocharger 104, particularly vapor turbine 10, the heat-transfer vapor from boiler 12, having a lowered enthalpy when exiting vapor turbine 10, is directed to a heat exchanger 22 via discharge line 21, particularly, through a first heat exchange portion of heat exchanger 22. Heat exchanger 22 is configured to indirectly cool the engine coolant fluid, which enters a second heat exchange portion of heat exchanger 22 via coolant line 29 and, as such, recovers heat from an engine cooling system 40. After recovering (i.e., absorbing) heat energy from engine cooling system 40, the heat-transfer vapor is then directed to an engine-driven vapor compressor 20 via line 23 to compress the heat-transfer vapor. Vapor compressor 20 may be belt driven by a drive pulley connected to a crank shaft of internal combustion engine 2. This drive pulley may carry an electromagnetic engaging clutch, which allows the aforementioned vapor cycle 42 to be engaged and disengaged when needed. It should be understood that vapor compressor 20 compresses the heat-transfer vapor to a semi-saturated state (i.e. the state that the vapor transforms into after it has been compressed to near to its saturation point). This compressed semi-saturated vapor (i.e., heat-transfer fluid) is subsequently directed to the vapor drum (not shown) of the boiler 12, via line 25, and thus completing vapor cycle 42.

To properly cool internal combustion engine 2, engine cooling system 40 includes a non-modulating three-way valve 24. Hot engine coolant fluid 39 is directed from internal combustion engine 2 via line 27 to the three-way valve 24, which automatically directs the hot engine coolant fluid 39 to either a heat exchanger 22, via line 29, or a radiator 26, via line 33. Radiator 26 may be positioned in parallel fluid communication with heat exchanger 22. It should be understood that all of hot engine coolant fluid 39 may be fed to only the heat exchanger 22 or only to the radiator 26 at one time. Alternatively, three-way valve 24 may be configured to selectively direct coolant fluid 39 to at least one of heat exchanger 22 or radiator 26 to remove heat from coolant fluid 39.

When internal combustion engine 2 is operating at a low-load state, whether at start up or the vehicle cruises down a grade, causing the temperature of the heat-transfer vapor in boiler 12 to be lower than a predetermined minimum threshold, for example, when the heat-transfer liquid is 50° C. at boiler discharge, and/or the flow rate of the vapor cycle 42 is lower than a predetermined minimum threshold, for example, 5 cubic feet per minute (cfm) at boiler discharge, a clutched pulley (not shown) disengages vapor compressor 20 and thus stops vapor cycle 42. When internal combustion engine 2 is operating in a high-load state, for example, the vehicle's operator opening the throttle valve to demand that the vehicle quickly accelerate, such that efficiency is not a high criterion, vapor compressor 20 may then be disengaged to shut down vapor cycle 42. As such, whenever vapor cycle 42 is disengaged (or the cycle flow rate is below a predetermined minimum value), three-way valve 24 may redirect the hot engine coolant fluid 39 to radiator 26. Radiator 26 is configured to cool the engine coolant fluid before being directed back to internal combustion engine 2 via line 35. When vapor cycle 42 is operating at desired level, three-way valve 24 may direct the coolant fluid to heat exchanger 22, where the heat in the coolant fluid is indirectly absorbed or otherwise transferred to the heat-transfer vapor before exiting via line 31 and ultimately returning to internal combustion engine 2 as cold coolant fluid 41 via line 35. As such, whenever vapor cycle 42 has an appropriate flow, radiator 26 is bypassed and vapor cycle 42 cools internal combustion engine 2. This allows for the recovery of thermal energy that would have been lost through radiator 26.

For reliability and operability purposes, an upper limit of the output power of internal combustion engine 2 may be regulated by limiting the pressure of the compressed air that goes to the air intake of internal combustion engine 2. This is done with the aid of an external wastegate valve 14 installed downstream of the exhaust outlet of internal combustion engine 2, and upstream from exhaust turbine 6. As shown, external wastegate valve 14 is piped into exhaust manifold 1 via a take-off line 3. To control the upper power limit and upper torque limit of engine output, a pneumatic signal line carries the intake manifold pressure to operate an actuator for external wastegate valve 14. When the air intake pressure gets to the desired upper limit, some of the intake air is redirected to operate the actuator of external wastegate valve 14. This in effect opens external wastegate valve 14 and discharges the required amount of exhaust gas out to atmosphere, preventing this exhaust gas from driving exhaust turbine 6 and boiler 12. Opening external wastegate valve 14 also prevents the intake manifold pressure from going any higher than the desired upper level. External wastegate valve 14 may be, but is not limited to, a 38 mm Tial External Waste Gate.

It should be understood the steps of the method presented herein do not necessarily have to be in the order in which it is presented. It is also understood that when an element is referred to as being "on", "connected to/with", or "coupled to/with" another element, the element can be directly on, connected to/with or coupled to/with the other element or intervening elements may also be present.

The foregoing description of the preferred embodiment of the invention has been presented for the purpose of illustration and description. It is not intended to be exhaustive nor is intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A thermal energy recovery system configured to capture thermal energy lost through operation of devices of an engine and utilize the captured thermal energy to increase the overall efficiency of the engine, wherein one of the devices includes an exhaust system including an exhaust manifold for emitting exhaust gas, and wherein another one of the devices is a cooling system including a coolant fluid, a three-way valve, and a radiator downstream of the three-way valve, the thermal energy recovery system comprising:

an exhaust turbocharger including an exhaust turbine and a primary compressor, the exhaust turbine is in fluid communication and downstream of the exhaust manifold, and the primary compressor is in fluid communication and downstream of an ambient air intake;

a boiler including a first heat exchange portion and a second heat exchange portion, the first heat exchange portion of the boiler is in fluid communication and downstream of the exhaust turbine;

a vapor turbocharger including a vapor turbine and a secondary compressor, the vapor turbine is in fluid communication and downstream of the second heat exchange portion of the boiler, and the secondary compressor is in fluid communication and positioned downstream of the ambient air intake;

a heat exchanger including a first heat exchange portion and a second heat exchange portion, the first heat exchange portion of the heat exchanger is in fluid communication and positioned downstream of the vapor turbine, and the second heat exchange portion of the heat exchanger is in fluid communication with the coolant fluid within the cooling system; and a vapor compressor in fluid communication and downstream of the first heat exchange portion of the heat exchanger, and the vapor compressor is in fluid communication and upstream of the second heat exchange portion of the boiler, wherein the three-way valve is configured to selectively direct the coolant fluid to at least one of the second heat exchange portion of the heat exchanger or the radiator to remove heat from the coolant fluid, wherein the exhaust turbine is driven by the exhaust gas emitted from the exhaust manifold, which in turn allows the primary compressor to compress the air from the ambient air intake to provide compressed air to an engine air intake, wherein the exhaust gas emitted from the exhaust turbine is passed through the first heat exchange portion of the boiler, wherein heat from the exhaust gas is transmitted to a heat-transfer fluid passing through the second heat exchange portion of the boiler to form a heat-transfer vapor, wherein the vapor turbine is driven by the heat-transfer vapor emitted from the second heat exchange portion of the boiler, which in turn allows the secondary compressor to compress the air from the ambient air intake to provide compressed air to the engine air intake, wherein heat-transfer vapor emitted from the vapor turbine is passed through the first heat exchange portion of the heat exchanger, wherein heat from the coolant fluid passing through the second heat exchange portion of the heat exchanger is transmitted to the heat-transfer vapor, and wherein the vapor compressor is configured to compress the heat-transfer vapor from the first heat exchange portion of the heat exchanger to the heat-transfer fluid, wherein the heat-transfer fluid is in a semi-saturated state.

2. The thermal energy recovery system according to claim 1, wherein the vapor compressor is driven by the engine.

3. The thermal energy recovery system according to claim 1, further comprising a blow-off valve in fluid communication with and disposed downstream of the primary compressor and secondary compressor, wherein the blow-off valve is configured to recirculate the compressed air emitted from at least one of the primary compressor or the secondary compressor back to a suction of the primary compressor and the secondary compressor.

4. The thermal energy recovery system according to claim 1, further comprising a check valve in fluid communication and downstream of the secondary compressor, wherein the check valve is configured to prevent the compressed air emitted from the primary compressor from being communicated to the secondary compressor.

5. The thermal energy recovery system according to claim 1, further comprising an external waste gate valve in fluid communication with the exhaust manifold, wherein the external waste gate valve is configured to regulate at least one of an upper power limit and an upper torque limit of the engine.

6. The thermal energy recovery system according to claim 1, wherein the three-way valve is configured to automatically direct the coolant fluid to at least one of the second heat exchange portion of the heat exchanger or the radiator to remove heat from the coolant fluid.

7. The thermal energy recovery system according to claim 1, wherein the exhaust turbine and the primary compressor are connected by a shaft.

8. The thermal energy recovery system according to claim 1, wherein the vapor turbine and the secondary compressor are connected by a shaft.

9. The thermal energy recovery system according to claim 1, further including a throttle valve disposed upstream of the engine air intake and downstream of the primary compressor and the secondary compressor.

10. The thermal energy recovery system according to claim 1, wherein the primary compressor is an axial compressor, centrifugal compressor, mixed-flow compressor, or a free-piston gas generator.

11. The thermal energy recovery system according to claim 1, wherein the secondary compressor is an axial compressor, centrifugal compressor, mixed-flow compressor, or a free-piston gas generator.

12. The thermal energy recovery system according to claim 1, wherein the engine is an internal combustion engine.

13. A method of capturing thermal energy lost through operation of devices of an engine and utilizing the captured thermal energy to increase the overall efficiency of the engine, wherein one of the devices includes an exhaust system including an exhaust manifold for emitting exhaust gas, and wherein another one of the devices is a cooling system including a coolant fluid, a three-way valve, and a radiator disposed downstream of the three-way value, the method comprising:

providing an exhaust turbocharger including an exhaust turbine and a primary compressor, the exhaust turbine is in fluid communication and downstream of the exhaust manifold, and the primary compressor is in fluid communication and downstream of an ambient air intake;

providing a boiler including a first heat exchange portion and a second heat exchange portion, the first heat exchange portion of the boiler is in fluid communication and downstream of the exhaust turbine;

providing a vapor turbocharger including a vapor turbine and a secondary compressor, the vapor turbine is in fluid communication and downstream of the second heat exchange portion of the boiler, and the secondary compressor is in fluid communication and positioned downstream of the ambient air intake;

providing a heat exchanger including a first heat exchange portion and a second heat exchange portion, the first heat exchange portion of the heat exchanger is in fluid communication and positioned downstream of the vapor turbine, and the second heat exchange portion of the heat exchanger is in fluid communication with the coolant fluid within the cooling system;

providing a vapor compressor in fluid communication and downstream of the first heat exchange portion of heat exchanger, the vapor compressor is in fluid communication and upstream of the second heat exchange portion of the boiler;

selectively directing the coolant fluid to at least one of the second heat exchange portion of the heat exchanger or the radiator to remove heat from the coolant fluid;

driving the exhaust turbine by the exhaust gas emitted from the exhaust manifold;

compressing the air from the ambient air intake using the primary compressor to provide compressed air to an engine air intake;

passing the exhaust gas emitted from the exhaust turbine through the first heat exchange portion of the boiler;

passing a heat-transfer fluid through the second heat exchange portion of the boiler to form a heat-transfer vapor;

driving the vapor turbine by the heat-transfer vapor emitted from the second heat exchange portion of the boiler;

compressing the air from the ambient air intake using the secondary compressor to provide compressed air to the engine air intake;

passing the heat-transfer vapor emitted from the vapor turbine through the first heat exchange portion of the heat exchanger;

passing the coolant fluid through the second heat exchange portion of the heat exchanger to emit heat to the heat-transfer vapor;

compressing the heat-transfer vapor using the vapor compressor to the heat-transfer fluid, wherein the heat-transfer fluid is in a semi-saturated state; and communicating the heat-transfer fluid to the second heat exchange portion of the boiler.

14. The method according to claim 13, further comprising the step of driving the vapor compressor with the engine.

15. The method according to claim 13, further comprising:
providing a blow-off valve in fluid communication with and disposed downstream of the primary compressor and the secondary compressor; and
recirculating the compressed air emitted from at least one of the primary compressor or the secondary compressor, through the blow-off valve, back to a suction of the primary compressor and the secondary compressor.

16. The method according to claim 13, further comprising:
providing a check valve in fluid communication and downstream of the secondary compressor; and
preventing the compressed air emitted from the primary compressor from being communicated to the secondary compressor using the check valve.

17. The method according to claim 13, further comprising:
providing an external wastegate valve in fluid communication with the exhaust manifold; and
regulating at least one of an upper power limit and an upper torque limit of the engine using the external wastegate valve.

18. The method according to claim 13, wherein the three-way valve is configured to automatically direct the coolant fluid to at least one of the second heat exchange portion of the heat exchanger or the radiator to remove heat from the coolant fluid.

19. The method according to claim 13, wherein the exhaust turbine and the primary compressor are connected by a shaft.

20. The method according to claim 13, wherein the vapor turbine and the secondary compressor are connected by a shaft.

21. The method according to claim 13, further including:
providing a throttle valve disposed upstream of the engine air intake and downstream of the primary compressor and the secondary compressor; and
selectively controlling a flow of compressed air being fed to the engine using the throttle valve.

22. A thermal energy recovery system configured to capture thermal energy lost through operation of devices of an engine and utilize the captured thermal energy to increase the overall efficiency of the engine, wherein one of the devices includes an exhaust system including an exhaust manifold for emitting exhaust gas, and wherein another one of the devices is a cooling system including a coolant fluid, a three-way valve, and a radiator downstream of the three-way valve, the thermal energy recovery system comprising:
an exhaust turbocharger including an exhaust turbine and a primary compressor, the exhaust turbine is in fluid communication and downstream of the exhaust manifold, and the primary compressor is in fluid communication and downstream of an ambient air intake;
a boiler including a first heat exchange portion and a second heat exchange portion, the first heat exchange portion of the boiler is in fluid communication and downstream of the exhaust turbine;
an external waste gate valve in fluid communication with the exhaust manifold, wherein the external waste gate valve is configured to regulate at least one of an upper power limit and an upper torque limit of the engine;
a vapor turbocharger including a vapor turbine and a secondary compressor, the vapor turbine is in fluid communication and downstream of the second heat exchange portion of the boiler, and the secondary compressor is in fluid communication and positioned downstream of the ambient air intake;
a check valve in fluid communication and downstream of the secondary compressor, wherein the check valve is configured to prevent the compressed air emitted from the primary compressor from being communicated to the secondary compressor;
a blow-off valve in fluid communication with and disposed downstream of the primary compressor and secondary compressor, wherein the blow-off valve is configured to recirculate the compressed air emitted from at least one of the primary compressor or the secondary compressor back to a suction of the primary compressor and the secondary compressor;
a heat exchanger including a first heat exchange portion and a second heat exchange portion, the first heat exchange portion of the heat exchanger is in fluid communication and positioned downstream of the vapor turbine, and the second heat exchange portion of the heat exchanger is in fluid communication with the coolant fluid within the cooling system; and
a vapor compressor in fluid communication and downstream of the first heat exchange portion of the heat exchanger, and the vapor compressor is in fluid communication and upstream of the second heat exchange portion of the boiler, wherein the three-way valve is configured to selectively direct the coolant fluid to at least one of the second heat exchange portion of the heat exchanger or the radiator to remove heat from the coolant fluid, wherein the exhaust turbine is driven by the exhaust gas emitted from the exhaust manifold, which in turn allows the primary compressor to compress the air from the ambient air intake to provide compressed air to an engine air intake, wherein the exhaust gas emitted from the exhaust turbine is passed through the first heat exchange portion of the boiler, wherein heat from the exhaust gas is transmitted to a heat-transfer fluid passing through the second heat exchange portion of the boiler to form a heat-transfer vapor, wherein the vapor turbine is driven by the heat-transfer vapor emitted from the second heat exchange portion of the boiler, which in turn allows the secondary compressor to compress the air from the ambient air intake to provide compressed air to the engine air intake, wherein heat-transfer vapor emitted from the vapor turbine is passed through the first heat exchange portion of the heat exchanger, wherein heat from the coolant fluid passing through the second heat exchange portion of the heat exchanger is transmitted to the heat-transfer vapor, and wherein the vapor compressor is configured to compress the heat-transfer vapor from the first heat exchange portion of the heat exchanger to the heat-transfer fluid, wherein the heat-transfer fluid is in a semi-saturated state.

23. The thermal energy recovery system according to claim 22, wherein the vapor compressor is driven by the engine.

24. The thermal energy recovery system according to claim 22, wherein the three-way valve is configured to automatically direct the coolant fluid to at least one of the second heat exchange portion of the heat exchanger or the radiator to remove heat from the coolant fluid.

25. The thermal energy recovery system according to claim 22, wherein the exhaust turbine and the primary compressor are connected by a shaft.

26. The thermal energy recovery system according to claim 22, wherein the vapor turbine and the secondary compressor are connected by a shaft.

27. The thermal energy recovery system according to claim 22, further including a throttle valve disposed upstream of the engine air intake and downstream of the primary compressor and the secondary compressor.

28. The thermal energy recovery system according to claim 22, wherein the primary compressor is an axial compressor, centrifugal compressor, mixed-flow compressor, or a free-piston gas generator.

29. The thermal energy recovery system according to claim 22, wherein the secondary compressor is an axial compressor, centrifugal compressor, mixed-flow compressor, or a free-piston gas generator.

30. The thermal energy recovery system according to claim 22, wherein the engine is an internal combustion engine.

31. A thermal energy recovery system configured to capture thermal energy lost through operation of devices of an engine and utilize the captured thermal energy to increase the overall efficiency of the engine, wherein one of the devices includes an exhaust system including an exhaust manifold for emitting exhaust gas, and wherein another one of the devices is a cooling system including a coolant fluid, a three-way valve, and a radiator downstream of the three-way valve, the thermal energy recovery system comprising:

an exhaust turbocharger including an exhaust turbine and a primary compressor, the exhaust turbine is in fluid communication and downstream of the exhaust manifold, and the primary compressor is in fluid communication and downstream of an ambient air intake;

a boiler including a first heat exchange portion and a second heat exchange portion, the first heat exchange portion of the boiler is in fluid communication and downstream of the exhaust turbine;

a vapor turbocharger including a vapor turbine and a secondary compressor, the vapor turbine is in fluid communication and downstream of the second heat exchange portion of the boiler, and the secondary compressor is in fluid communication and positioned downstream of the ambient air intake;

a heat exchanger including a first heat exchange portion and a second heat exchange portion, the first heat exchange portion of the heat exchanger is in fluid communication and positioned downstream of the vapor turbine, and the second heat exchange portion of the heat exchanger is in fluid communication with the coolant fluid within the cooling system; and a vapor compressor in fluid communication and downstream of the first heat exchange portion of the heat exchanger, and the vapor compressor is in fluid communication and upstream of the second heat exchange portion of the boiler, wherein the three-way valve is configured to selectively direct all of the coolant fluid to only the second heat exchange portion of the heat exchanger or only the radiator to remove heat from the coolant fluid, wherein the exhaust turbine is driven by the exhaust gas emitted from the exhaust manifold, which in turn allows the primary compressor to compress the air from the ambient air intake to provide compressed air to an engine air intake, wherein the exhaust gas emitted from the exhaust turbine is passed through the first heat exchange portion of the boiler, wherein heat from the exhaust gas is transmitted to a heat-transfer fluid passing through the second heat exchange portion of the boiler to form a heat-transfer vapor, wherein the vapor turbine is driven by the heat-transfer vapor emitted from the second heat exchange portion of the boiler, which in turn allows the secondary compressor to compress the air from the ambient air intake to provide compressed air to the engine air intake, wherein heat-transfer vapor emitted from the vapor turbine is passed through the first heat exchange portion of the heat exchanger, wherein heat from the coolant fluid passing through the second heat exchange portion of the heat exchanger is transmitted to the heat-transfer vapor, and wherein the vapor compressor is configured to compress the heat-transfer vapor from the first heat exchange portion of the heat exchanger to the heat-transfer fluid, wherein the heat-transfer fluid is in a semi-saturated state.

32. The thermal energy recovery system according to claim 31, wherein the three-way valve is a non-modulating three-way valve.

33. A method of capturing thermal energy lost through operation of devices of an engine and utilizing the captured thermal energy to increase the overall efficiency of the engine, wherein one of the devices includes an exhaust system including an exhaust manifold for emitting exhaust gas, and wherein another one of the devices is a cooling system including a coolant fluid, a three-way valve, and a radiator disposed downstream of the three-way value, the method comprising:

providing an exhaust turbocharger including an exhaust turbine and a primary compressor, the exhaust turbine is in fluid communication and downstream of the exhaust manifold, and the primary compressor is in fluid communication and downstream of an ambient air intake;

providing a boiler including a first heat exchange portion and a second heat exchange portion, the first heat exchange portion of the boiler is in fluid communication and downstream of the exhaust turbine;

providing a vapor turbocharger including a vapor turbine and a secondary compressor, the vapor turbine is in fluid communication and downstream of the second heat exchange portion of the boiler, and the secondary compressor is in fluid communication and positioned downstream of the ambient air intake;

providing a heat exchanger including a first heat exchange portion and a second heat exchange portion, the first heat exchange portion of the heat exchanger is in fluid communication and positioned downstream of the vapor turbine, and the second heat exchange portion of the heat exchanger is in fluid communication with the coolant fluid within the cooling system;

providing a vapor compressor in fluid communication and downstream of the first heat exchange portion of heat exchanger, the vapor compressor is in fluid communication and upstream of the second heat exchange portion of the boiler;

selectively directing all of the coolant fluid to only the second heat exchange portion of the heat exchanger or only the radiator to remove heat from the coolant fluid;

driving the exhaust turbine by the exhaust gas emitted from the exhaust manifold;

compressing the air from the ambient air intake using the primary compressor to provide compressed air to an engine air intake;

passing the exhaust gas emitted from the exhaust turbine through the first heat exchange portion of the boiler;

passing a heat-transfer fluid through the second heat exchange portion of the boiler to form a heat-transfer vapor;

driving the vapor turbine by the heat-transfer vapor emitted from the second heat exchange portion of the boiler;

compressing the air from the ambient air intake using the secondary compressor to provide compressed air to the engine air intake;

passing the heat-transfer vapor emitted from the vapor turbine through the first heat exchange portion of the heat exchanger;

passing the coolant fluid through the second heat exchange portion of the heat exchanger to emit heat to the heat-transfer vapor;

compressing the heat-transfer vapor using the vapor compressor to the heat-transfer fluid, wherein the heat-transfer fluid is in a semi-saturated state; and communicating the heat-transfer fluid to the second heat exchange portion of the boiler.

\* \* \* \* \*